METHOD OF MAKING TAPE REPLICAS

Filed June 25, 1968 2 Sheets-Sheet 1

Inventor:
William E. Glenn Jr.,
by Richard R. Brainard
His Attorney.

Oct. 20, 1970 W. E. GLENN, JR 3,535,413

METHOD OF MAKING TAPE REPLICAS

Filed June 25, 1968

2 Sheets-Sheet 2

Inventor:
William E. Glenn, Jr.,
by Richard R. Brainard
His Attorney.

3,535,413
METHOD OF MAKING TAPE REPLICAS
William E. Glenn, Jr., Stamford, Conn., assignor to General Electric Company, a corporation of New York
Filed June 25, 1968, Ser. No. 739,866
Int. Cl. B29c *1/02, 17/14;* B29f *5/00*
U.S. Cl. 264—160 6 Claims

ABSTRACT OF THE DISCLOSURE

Replicas of a tape having information stored thereon as a pattern of thickness deformations are produced by forming a metal surface on the tape and stripping it therefrom to provide a master, wrapping the tape on a cylindrical presser roller in spiral fashion with the deformed metal surface exposed, feeding heated thermoplastic sheet material between the exposed surface of the master and a mating roller having a resilient body provided with an optically smooth surface. The plastic sheet is the full width of the spiral wrap on the roller so that when a plastic sheet is produced equal in length to the product of the circumference of the master surface and the number of the turns of the master on the presser there is embossed thereon a number of recorded tracks in side by side relation equal to the number of turns of the master on the presser. These tracks extend at a slight angle withh respect to the side edge of the plastic sheet determined by the pitch angle of the metal master on the presser. Individual tape replicas are produced by cutting or slitting the plastic sheet between embossed tracks. The optically smooth surface is, in a second embodiment, provided by feeding between the embossing or presser roller and the mating roller a plastic sheet having an optically smooth surface facing the mating roller and forming on the other surface thereof the thermoplastic layer. Also, projections corresponding to the sprocket holes in the original tape are formed in the master to provide depressions in the replicas which are synchronous in position with the recorded information to provide for driving the replicated tapes.

The present invention relates to a method of making tape replicas of information recorded on tape in the form of thickness deformations.

In recent years, methods of recording information in the form of a pattern of thickness deformations of a thermoplastic recording layer have been developed. Such methods are disclosed and claimed, for example, in Pat. No. 3,113,179, Glenn, Jr., granted Dec. 3, 1963 and in Pat. No. 3,291,601, Gaynor. In both methods, the deformations are provided by establishing an electrostatic carge pattern corresponding to the information to be recorded on the recording layer and then heating or otherwise softening the thermoplastic to produce the deformation.

The recording media used in these methods are often in the form of flexible tapes having a deformed surface or recording layer. The deformations, as described in the above patents, may be in the form of light diffraction patterns, which are capable of reproducing the information, either by optical or electron beam readout systems. In many applications, there is a need for economical methods of making high quality replicas of the original recording. In Pat. No. 3,265,776, Henkes, Jr., granted Aug. 9, 1966, there is described and claimed a method of making tape replicas by casting or pressing a liquid or semi-liquid material onto the original recording and then stripping it off to provide the replica.

In accordance with a preferred embodiment of the present invention, replicas of a tape having information stored thereon as a pattern of thickness deformations are produced by forming a metal surface on the tape and stripping it therefrom to provide a master, wrapping the tape on a cylindrical presser roller in spiral fashion with the deformed metal surface exposed, feeding heated thermoplastic sheet material between the exposed surface of the master and a mating roller having a resilient body provided with an optically smooth surface. The plastic sheet is the full width of the spiral wrap on the roller so that when a plastic sheet is produced equal in length to the product of the circumference of the master surface and the number of the turns of the master on the presser there is embossed thereon a number of recorded tracks in side by side relation equal to the number of turns of the master on the presser. These tracks extend at a slight angle with respect to the side edge of the plastic sheet determined by the pitch angle of the metal master on the presser. Individual tape replicas are produced by cutting or slitting the plastic sheet between embossed tracks. The optically smooth surface is, in a second embodiment, provided by feeding betweeen the embossing or presser roller and the mating roller a plastic sheet having an optically smooth surface facing the mating roller and forming on the other surface thereof the thermoplastic layer. Also, projections corresponding to the sprocket holes in the original tape are formed in the master to provide depressions in the replicas which are synchronous in position with the recorded information to provide for driving the replicated tapes.

The features and advantages of my invention will become more apparent as the following description proceeds, reference being had to the accompanying drawing and the scope will be pointed out in the appended claims.

Figures 1, 2:
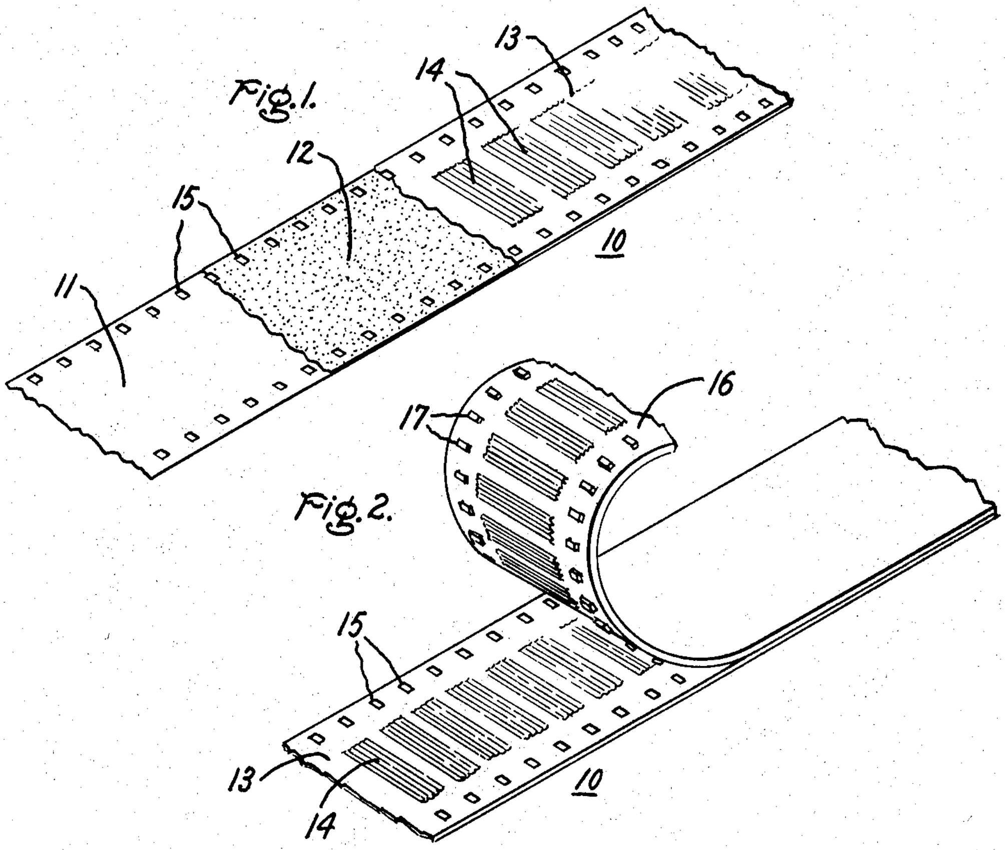
FIG. 1 is a fragmentary view of a thermoplastic recording on a three-layer tape.
FIG. 2 shows the removal of the metal presser strip or master from the original thermoplastic recording.

A thermoplastic recording on a three-layer tape is illustrated in FIG. 1. This recording may, for example, be made in accordance with the method of Glenn Pat. 3,113,179, in accordance with which method the recording surface is scanned with an electron beam modulated in accordance with the information to be recorded, the tape being subsequently heated to produce the deformations and returned to a cooler state to retain the deformations independently of the charge pattern. The tape 10, as described in detail in the aforementioned patent, may include an optically clear base 11 of material such as polyethylene terephthalate available under the trademark Cronar. A transparent conducting coating 12 overlies the base layer and a thin recording layer 13 of thermoplastic material overlies the transparent conducting coating. The recording layer may comprise a blend of polystyrene, m-terphenyl and a copolymer of butadiene and styrene. Other thermoplastic materials suitable for this purpose are described and claimed in Boldebuck Pat. No. 3,068,372, granted Nov. 13, 1962.

As shown in FIG. 1, the recording layer 13 includes the information containing deformations which are schematically shown at 14 and, as described in the aforementioned Glenn patent, may be in the form of phase diffraction patterns. The tape also is provided with sprockets or drive openings 15 in the margin thereof which facilitate synchronization of the tape movement with the recorded information. It is to be understood that the tape recording is wound on a suitable storage reel and, in accordance with the first step of the present method, is provided on the deformed surface with a metal layer 16, which conforms exactly with the deformed surface so that when it is stripped from the recording, it provides a negative replica of the deformations. Such a metal layer may be provided by coating a thin copper layer on the recording by a method known as "electroless plating." The coating is preferably of copper and may be carried out in accordance with the process described in detail and claimed in Pat. No. 2,938,805, Agens, granted May 31, 1960. The copper coating is built up to a thickness of 5 microns, for example, by this process and by another step of a continuous process, if desired, the copper coating may be increased in thickness by normal electro-plating techniques to about 4 mils, for example. The result is a thermoplastic recording with a metal film having one surface which conforms to the configuration of the recording surface of the recording and a back surface which is smooth. Nickel may be used for the electroplated layer, if desired. As is illustrated in FIG. 2, this metal master or presser tape 16 is readily peeled from the recording and provides a durable self-supporting and highly faithful reproduction of the original recording and, if used for pressing, will produce multiple replicas of the original. As shown in FIG. 2, the metal presser is formed with projections 17 corresponding to the sprocket openings 15.

Figure 3:
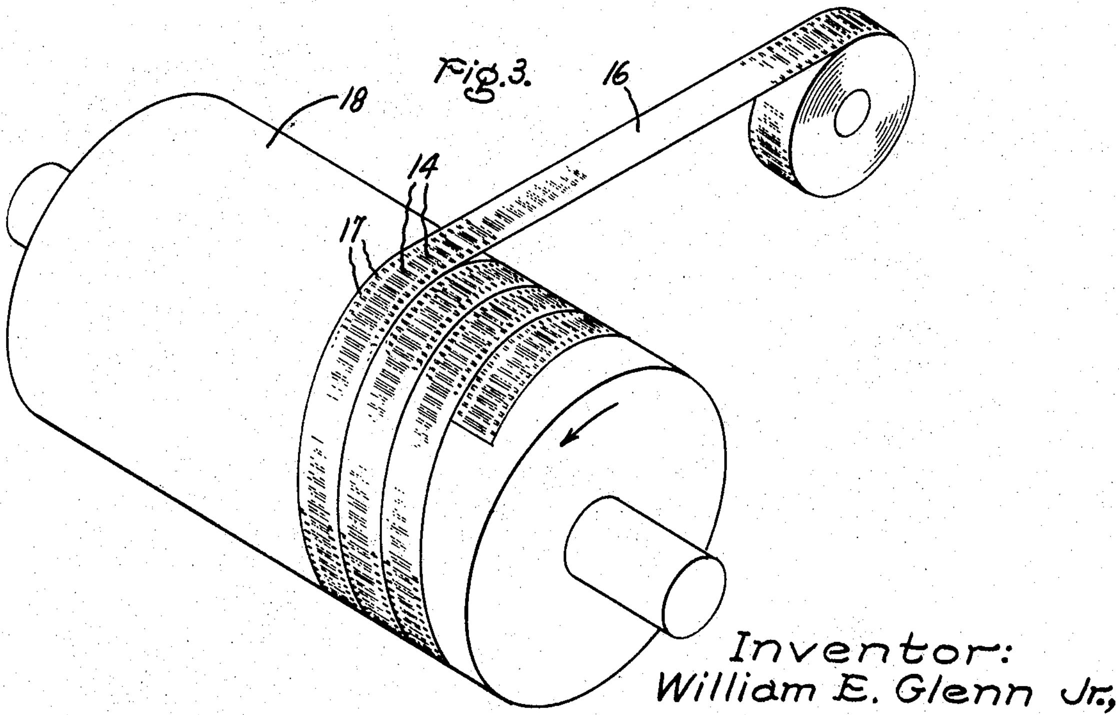
FIG. 3 illustrates the application of the metal presser to the presser roll.
Figures 4, 5:
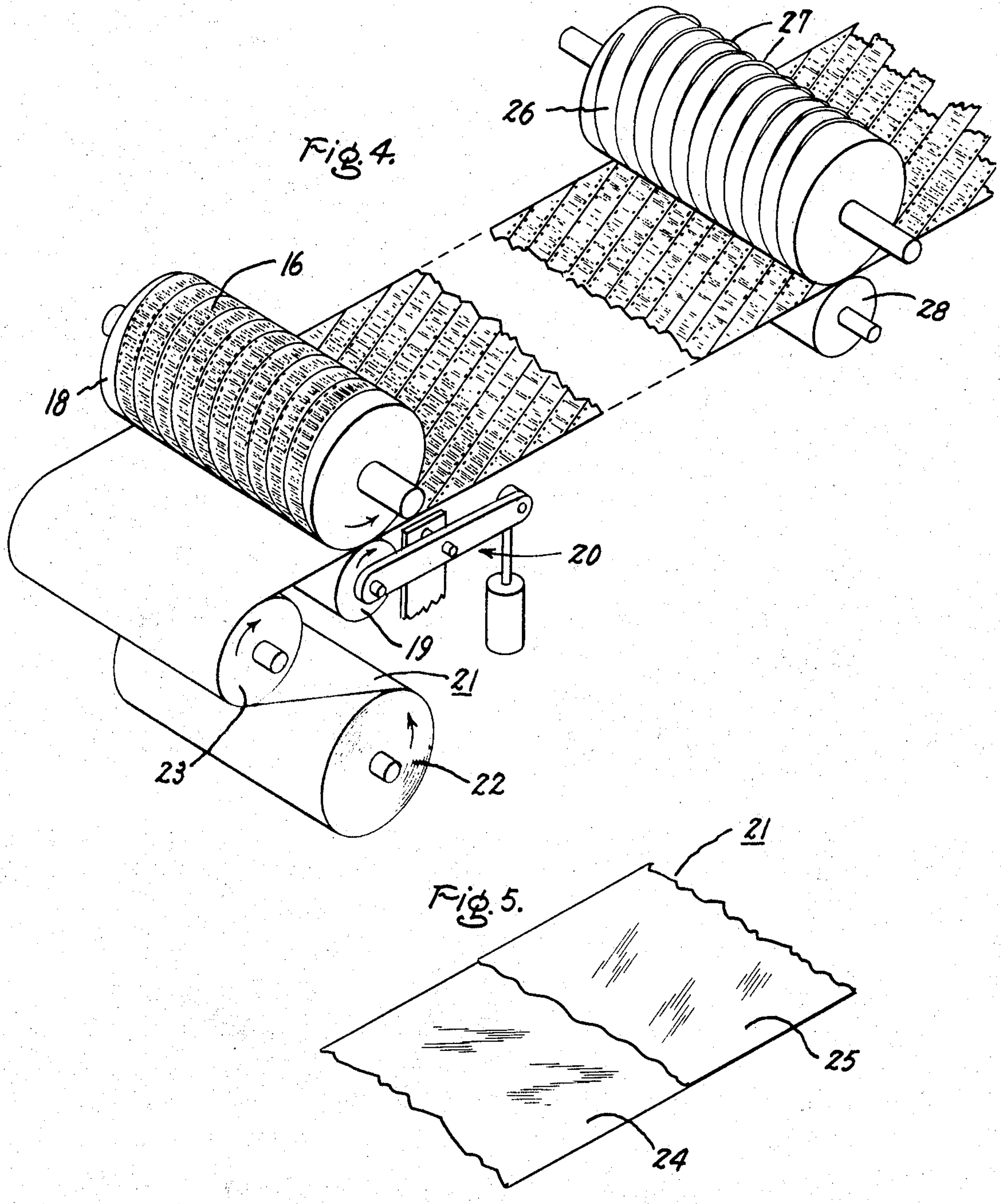
FIG. 4 is a schematic representation of the replicating equipment.
FIG. 5 illustrates a two-layer plastic sheet or tape suitable for the replicas.

In accordance with an important feature of the present invention, the metal presser or replicator tape 16 is wound on a presser roll 18 in spiral fashion. As shown, the metal presser tape is wound on the presser roller in spiral fashion, and the pitch of the spiral is shown exaggerated in FIG. 3, it being understood that the diameter of the roller, the width of the roller and the width of the tape are chosen so that the desired length of replicas are equal to the length of the master wrapped on the pressing roller. The tape is wrapped with the deformations on the outer surface of the master and the master is preferably secured to the presser roller by a suitable adhesive, which may be an epoxy resin adhesive or it may be a room-temperature vulcanizing silicone rubber compound, for example room-temperature curing organopolysiloxane compounds of the type that are claimed and described in Berridge Pat. No. 2,843,555. As an example, if we assume that the tape recording is 25 millimeters wide and the roll is a meter wide, then a 100-foot replica can be made by 40 turns on a roller having a diameter determined by the relationship $100=40\pi D$ or the diameter of the roll equals $2.5/\pi$ or approximately .8 feet. As will be more apparent from the description of FIG. 4, with such a presser it is possible to process a thermoplastic sheet a meter wide and when the presser has operatively engaged the surface for a length of 100 feet, 40 replicas 100 feet long will have been produced. It is apparent from the figure, that only one replica is complete in the first 100-foot strip but that each 100 feet after the first will provide 40 complete replicas. FIG. 4 shows schematically the apparatus for accomplishing the pressing and the splitting of the plastic sheet into 40 tape replicas. The embossing machine includes a pair of rollers, one of which is the embossing or presser roller 18 on which the metal presser 16 has been adhered and the second is the backup roll 19 of resilient material such as rubber. Both rolls may be driven by means, not shown, and the pressure of the backup roll maintained by resilient pressure-applying means illustrated generally at 20. In accordance with one embodiment, a supply of sheet material 21 for the replicas having the desired width which in the example above is a meter wide, is provided from supply reel 22. The sheet is passed over a heated roller 23 with the recording surface of the material facing upwardly so that as it passes between the rollers 18 and 19 after being heated, it is embossed to produce the replicas of the information bearing deformations as the sheet passes through, it being understood that when a presser roller makes a number of revolutions equal in number to the number of turns of the metal presser 16 on the surface thereof, a repeating unit of 40 replicas is produced.

The sheet material on which the replicas are formed is preferably of two layers, including a base 24 and thermoplastic layer 25, as shown in FIG. 5. Materials similar to those used in connection with the original tape for recording may be employed. Cheaper materials may be utilized to advantage, however, since the electrical properties are not important. It is only essential that the materials be of good quality optically and that the mechanical and thermal properties be suitable so that deformations may be made by heating the recording layer and that they may be retained at all temperatures normally encountered in use and in storage. It is desirable that the substrate melt at a substantially higher temperature than the layer on which the recording is embossed. The recording layer 25 is 5 to 15 microns thick and may be selected from a number of classes of material such as acrylics, cellulose, polycarbonate, vinyl and polypropylene plastics. Since it need not soften while electrically charged, it may have a higher melting point than the recording layer of the original recording medium and may be in the order of 200° C., for example. The base may be 2 to 4 mils thick and of a triacetate material such as used for photographic film bases.

A power driven film splitter 26 in the form of a roller with spiral cutting edges 27 spaced according to the boundaries of adjacent replicated tapes is provided. A cooperating backup roller 28 is also provided. As illustrated, the cutting roll and the presser roll are of the same diameter. If the cutting roller is of a different diameter, the driving speed and the pitch angle of the cutter must be appropriately chosen so that the cutting edge follows the desired boundary between adjacent tapes. It will be understood that the tape replicas are suitably collected and placed on reels after the splitting operation.

As mentioned earlier, the metal presser is provided with projections 17 which are located at the desired positions for the drive sprocket openings. Since it is essential that these projections not, in any way, limit a clear embossing of the recorded information, it is desirable that these be of reduced height. This can be accomplished by suitably protecting the back of the recording tape 10 from deposition of the metal which forms the master and extending this protection into the openings for a part of their depths. The resulting replicas then have depressions formed at the proper locations for the sprocket and these may be punched through to form the sprocket openings. This may be accomplished at the same time as the splitting operation, if desired.

As will be readily understood by those skilled in the art, the deformation layer for the replica may be formed at the same time as it is embossed by a modification of the embossing apparatus to include apparatus for extruding a layer of deformable plastic on the flexible base. In such a modification, sheet material in the form of a plastic base layer having an optically smooth surface is fed between the rollers 18 and 19 of the embosser and forms a support at the entrance to the roller onto which plastic material is extruded in a thin layer.

It will be apparent to those skilled in the art that changes and modifications may be made in the present invention without departing from the true spirit and scope thereof and it is intended in the independent claims to cover all such changes and modifications as fall within the true spirit and scope of the invention.

What I claim as new and desire to secure by Letters Patent of the United States is:

1. The method of producing tape replicas of information stored as thickness deformations on a tape of plastic material which comprises producing a presser master tape having a surface shaped to conform with the deformations containing the stored information, wrapping the presser master tape on a roller in spiral fashion with the deformed surface exposed so that the total length of the presser master tape on the roller is equal to the length of tape to be reproduced, embossing a sheet of plastic having a width equal to the width of the wrapped portion of the roller with the deformations on the master so that *n* spiral track of recorded information are formed on the plastic sheet where *n* is the number of turns of the master on the roller and splitting the sheet spirally between adjacent turns to produce *n* tape replicas.

2. The method of claim 1 wherein the master is formed of metal deposited on a recording and then stripped therefrom.

3. The method of claim 1 wherein the formation of a deformation layer on the plastic sheet and the embossing are accomplished by feeding heated thermoplastic between the embossing surface and the plastic sheet passing over a mating roller.

4. The method of claim 3 wherein the mating roller is resilient and is provided with an optically smooth surface.

5. The method of claim 3 wherein a tape substrate of optically smooth thermoplastic sheet material is fed between the embossing roller and the mating roller and a layer of thermoplastic of lower softening temperature than the substrate is formed on the substrate and embossed.

6. The method of claim 2 wherein the master tape is formed with projections at the edges thereof which form depressions for driving the tape replicas in synchronism with the embossed information on the replicas.

References Cited

UNITED STATES PATENTS

| | | | |
|---|---|---|---|
| 837,061 | 11/1906 | Harris | 264—293 X |
| 2,094,280 | 9/1937 | Proctor | 117—10 X |
| 2,247,991 | 7/1941 | Daniel | 264—284 X |
| 2,274,570 | 2/1942 | Westerkamp | 264—220 X |
| 3,056,691 | 10/1962 | Zartl | 117—4 |
| 3,113,179 | 12/1963 | Glenn. | |
| 3,265,776 | 8/1966 | Henkes | 264—227 X |

ALFRED L. LEAVITT, Primary Examiner

T. E. BOKAN, Assistant Examiner

U.S. Cl. X.R.

117—4, 10, 138.8, 145; 264—219, 284; 346—74